(12) United States Patent
Taylor (10) Patent No.: US 8,100,541 B2
(45) Date of Patent: Jan. 24, 2012

(54) DISPLAYING AND NAVIGATING DIGITAL MEDIA

(76) Inventor: Alexander S. Taylor, London (GB)

( * ) Notice: Subject to any disclaimer, the term of this patent is extended or adjusted under 35 U.S.C. 154(b) by 994 days.

(21) Appl. No.: 11/681,011

(22) Filed: Mar. 1, 2007

(65) Prior Publication Data

US 2008/0212039 A1 Sep. 4, 2008

(51) Int. Cl.
*G03B 21/00* (2006.01)

(52) U.S. Cl. ....................................... 353/122

(58) Field of Classification Search .................. 353/79, 353/101, 122, 7, 69–70; 359/446, 449
See application file for complete search history.

(56) References Cited

U.S. PATENT DOCUMENTS

| | | | |
|---|---|---|---|
| 6,302,542 B1 * | 10/2001 | Tsao | 353/7 |
| 6,392,689 B1 * | 5/2002 | Dolgoff | 348/44 |
| 6,431,711 B1 * | 8/2002 | Pinhanez | 353/69 |
| 6,600,502 B1 | 7/2003 | Brewster, Jr. | |
| 6,718,308 B1 | 4/2004 | Nolting | |
| 7,119,811 B2 | 10/2006 | Ernst et al. | |
| 7,252,386 B2 * | 8/2007 | Matsumoto | 353/69 |
| 7,425,072 B2 * | 9/2008 | Hama et al. | 353/10 |
| 7,623,779 B2 * | 11/2009 | Inoue et al. | 396/116 |
| 2003/0122873 A1 | 7/2003 | Dieberger et al. | |
| 2004/0070675 A1 | 4/2004 | Fredlund et al. | |
| 2004/0189704 A1 | 9/2004 | Walsh et al. | |
| 2005/0005241 A1 | 1/2005 | Hunleth et al. | |
| 2005/0160113 A1 | 7/2005 | Sipusic et al. | |
| 2007/0016868 A1 | 1/2007 | Nurmi | |
| 2007/0099700 A1 * | 5/2007 | Solomon et al. | 463/34 |
| 2007/0296572 A1 * | 12/2007 | Fein et al. | 340/539.13 |
| 2011/0187943 A1 * | 8/2011 | Cox et al. | 348/789 |

OTHER PUBLICATIONS

Jacucci, Giulio et al., Configuring Gestures as Expressive Interaction to Navigate Multimedia Recordings from Visits on Multiple Projections, MUM 2004, Oct. 27-29, 2004, 8 pages.

Ramos, Gonzalo et al., "Fluid Interaction Techniques for the Control and Annotation of Digital Video", 2003 ACM, Vancouver, Canada, 10 pages.

Sreenivasulu, V. "The role of a digital librarian in the management of digital information system (DIS)", retreived from the internet on Feb. 28, 2007 at <<http://scholar.google.com/scholar?hl=en&lr=&newwindow=1&q=cache:Jzw866JAjLsJ:eprints.rclis.org/archive/00004227/+>>, 18 pages.

* cited by examiner

*Primary Examiner* — Tony Ko
*Assistant Examiner* — Jori S Reilly-Diakun
(74) *Attorney, Agent, or Firm* — Lee & Hayes, PLLC (57) ABSTRACT

A device for navigating and displaying digital media, such as images, videos, audio files etc, is described. The device determines the distance between the device and a projection screen and selects media for display based on this distance. A user can, therefore, navigate through a media collection by moving the projection screen with respect to the device.

17 Claims, 10 Drawing Sheets

DISPLAYING AND NAVIGATING DIGITAL MEDIA

BACKGROUND

With the increase in the availability and use of digital cameras, many people now have a very large archive of digital photographs. Few options exist for displaying these images digitally and therefore many people obtain prints of these images in order that they can be placed in a photograph album or frame and viewed in a traditional, casual manner. Navigating these archives of digital images, which are generally stored on home computers, is also not a simple process and although many custom applications have been developed, they generally require a high degree of engagement by the user, in order to be able to navigate through file-folder hierarchies or tree-like browsers.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A device for navigating and displaying digital media, such as images, videos, audio files etc, is described. The device determines the distance between the device and a projection screen and selects media for display based on this distance. A user can, therefore, navigate through a media collection by moving the projection screen with respect to the device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
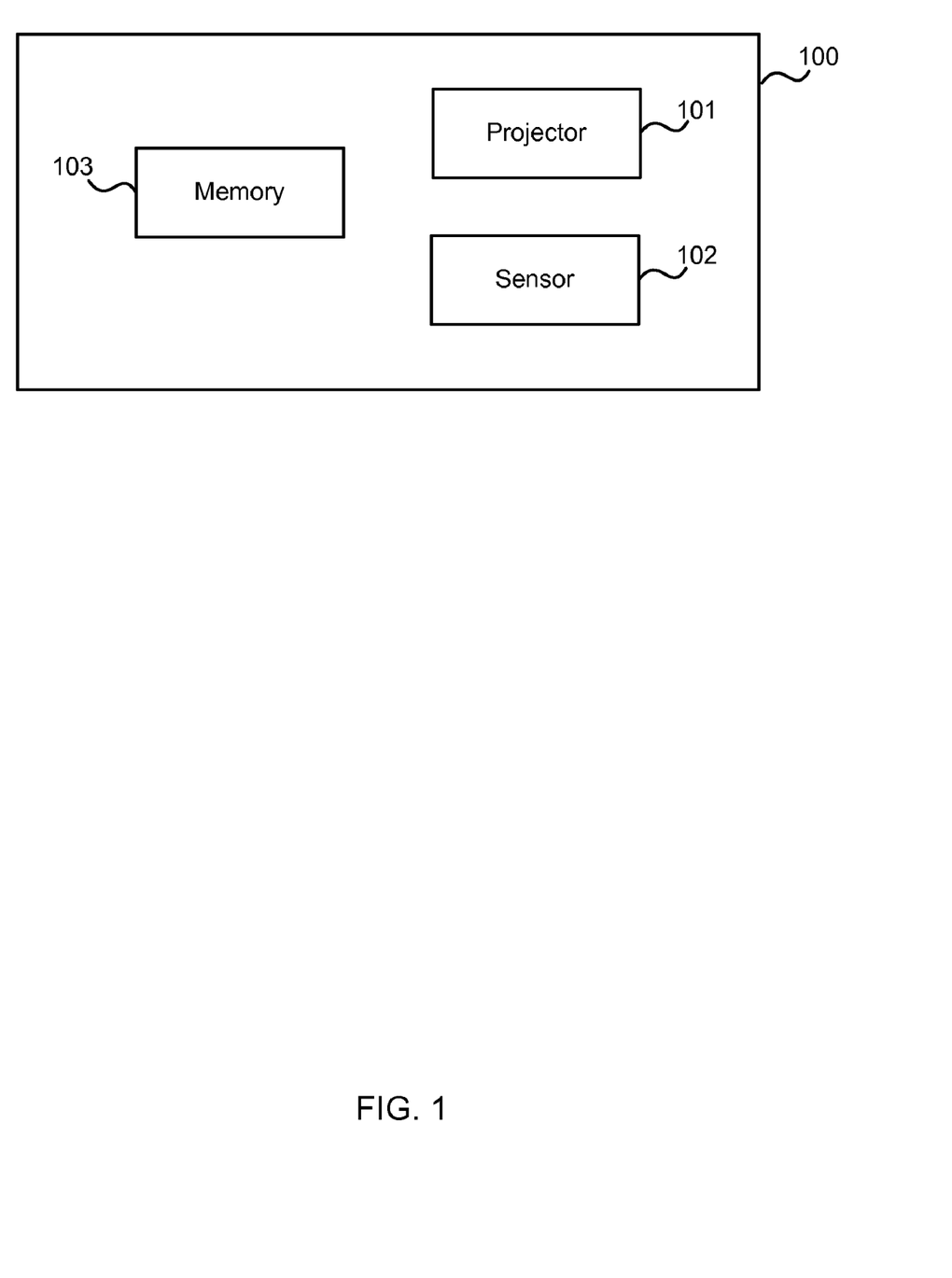
FIG. 1 is a schematic diagram of an apparatus for viewing, displaying and navigating digital media.

FIG. 1 is a schematic diagram of an apparatus 100 for viewing, displaying and navigating digital media, such as images, videos, audio clips etc. The apparatus comprises a projector 101 and a sensor (or sensing system) 102. The projector may be any suitable means for projecting an image onto a surface, such as an LCD (liquid crystal display) projector, a CRT (cathode ray tube) projector or a DLP (digital light processing) projector. The sensor (or sensing system) may be any sensor which is suitable for measuring distance of a projection surface from the apparatus, including, but not limited to, an infra-red sensor (which uses light time of flight), a scanning laser and a laser interferometer. In other examples the sensor may comprise a computer vision system, including a camera, as described in more detail below.

The sensor or sensing system 102 need not have a high degree of accuracy in its measurement of the distance between the apparatus and the projector surface. In some examples, a measurement which is accurate to within a few millimeters may be suitable, whilst in other examples, greater accuracy may be provided. Additionally the distance measured need not be absolute but may be relative, such that changes in the distance between the apparatus and a projection surface are determined.

Figure 8:
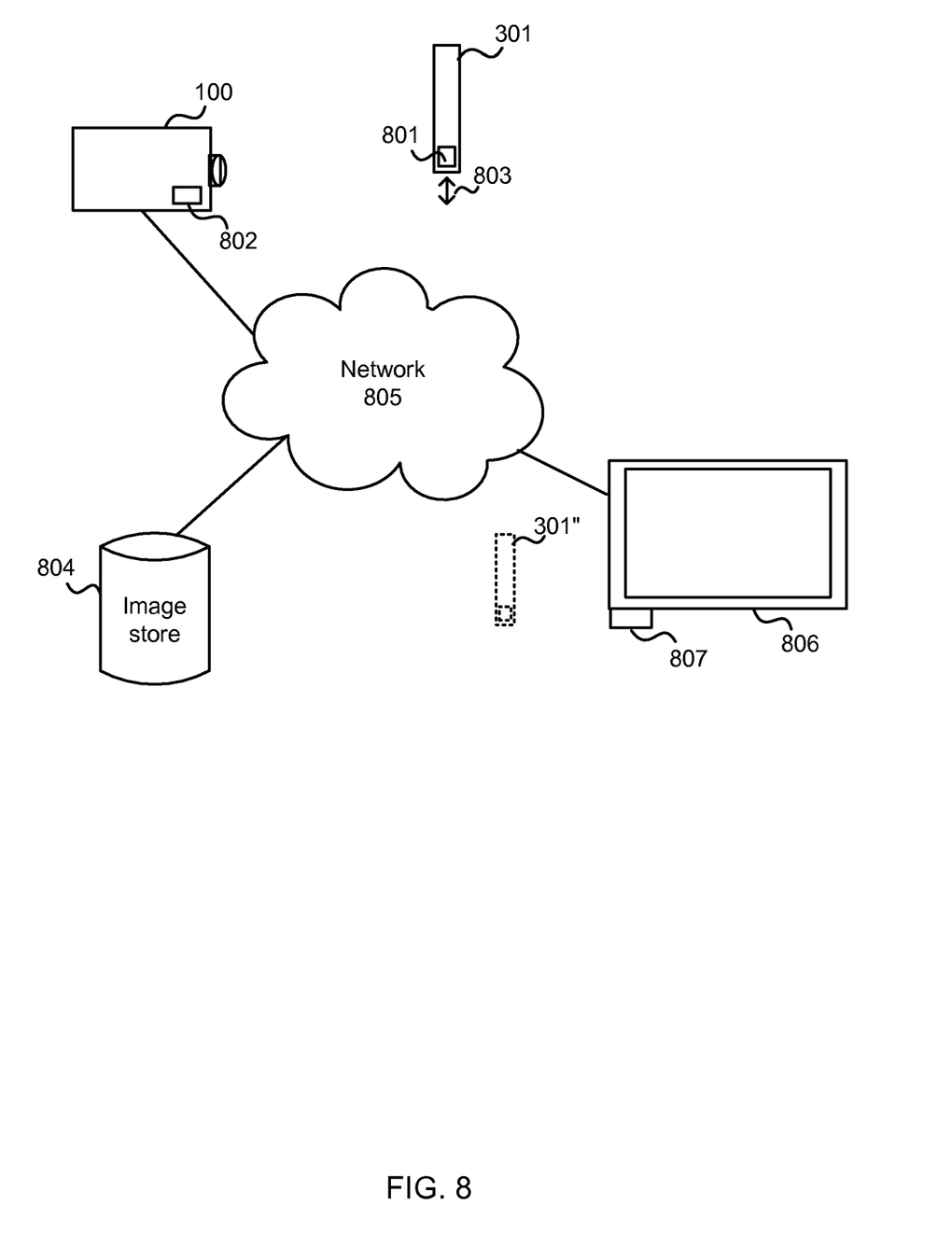
FIG. 8 shows an example system for viewing, displaying and navigating digital media.

The apparatus 100 may also comprise a store of digital media, such as memory 103, which may be a removable storage device (such as a memory stick, flash card, smart media, thumb drive etc) although in other examples, the digital media may be stored external to the apparatus (e.g. on the user's PC or on a central server, as shown in FIG. 8) and accessed by the apparatus via a network (e.g. over the internet, a home network etc) or point to point link (e.g. using a wireless connection to the user's PC).

Figure 2:
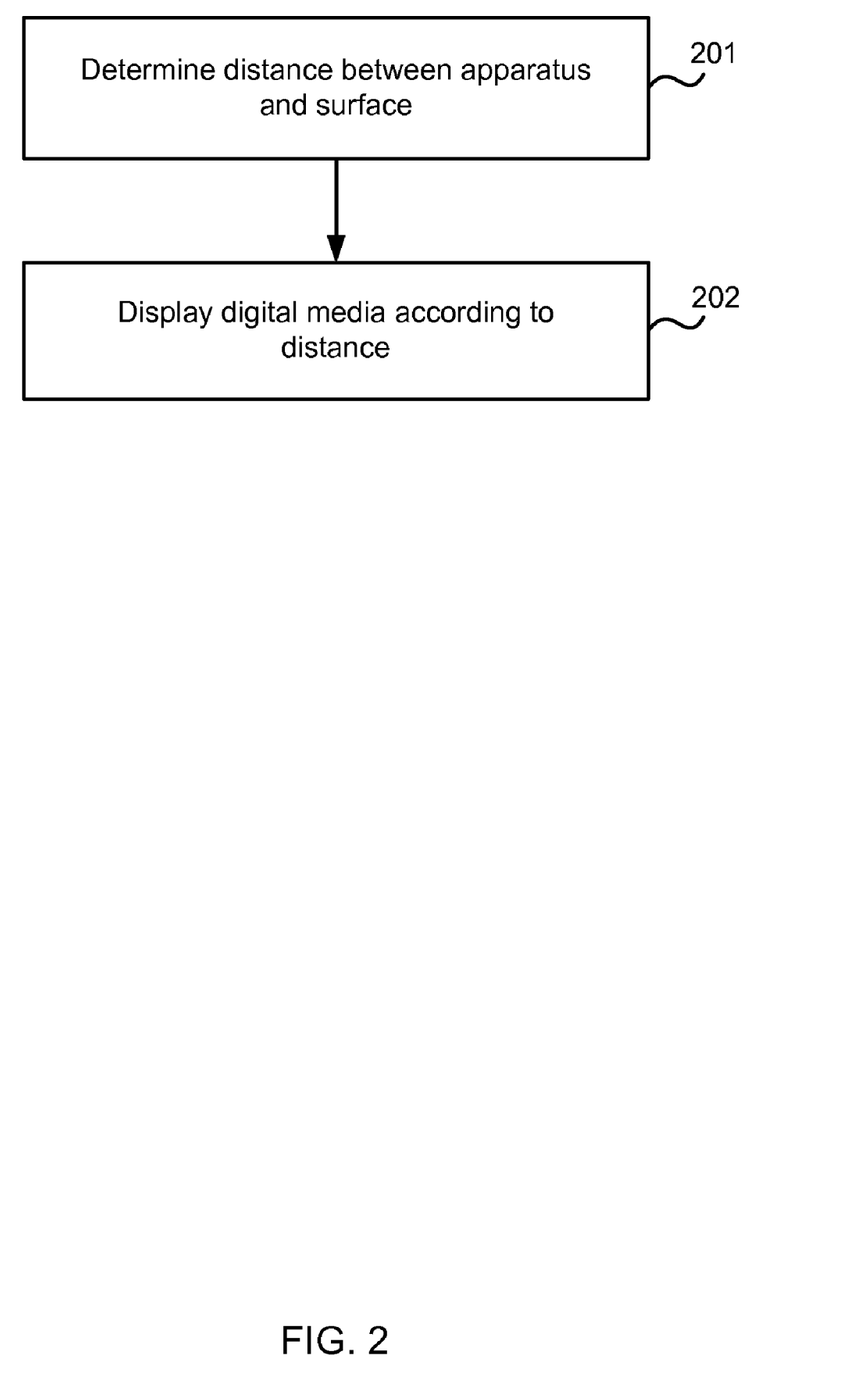
FIG. 2 shows an example flow diagram of a method of operation of the apparatus of FIG. 1.
Figure 3:
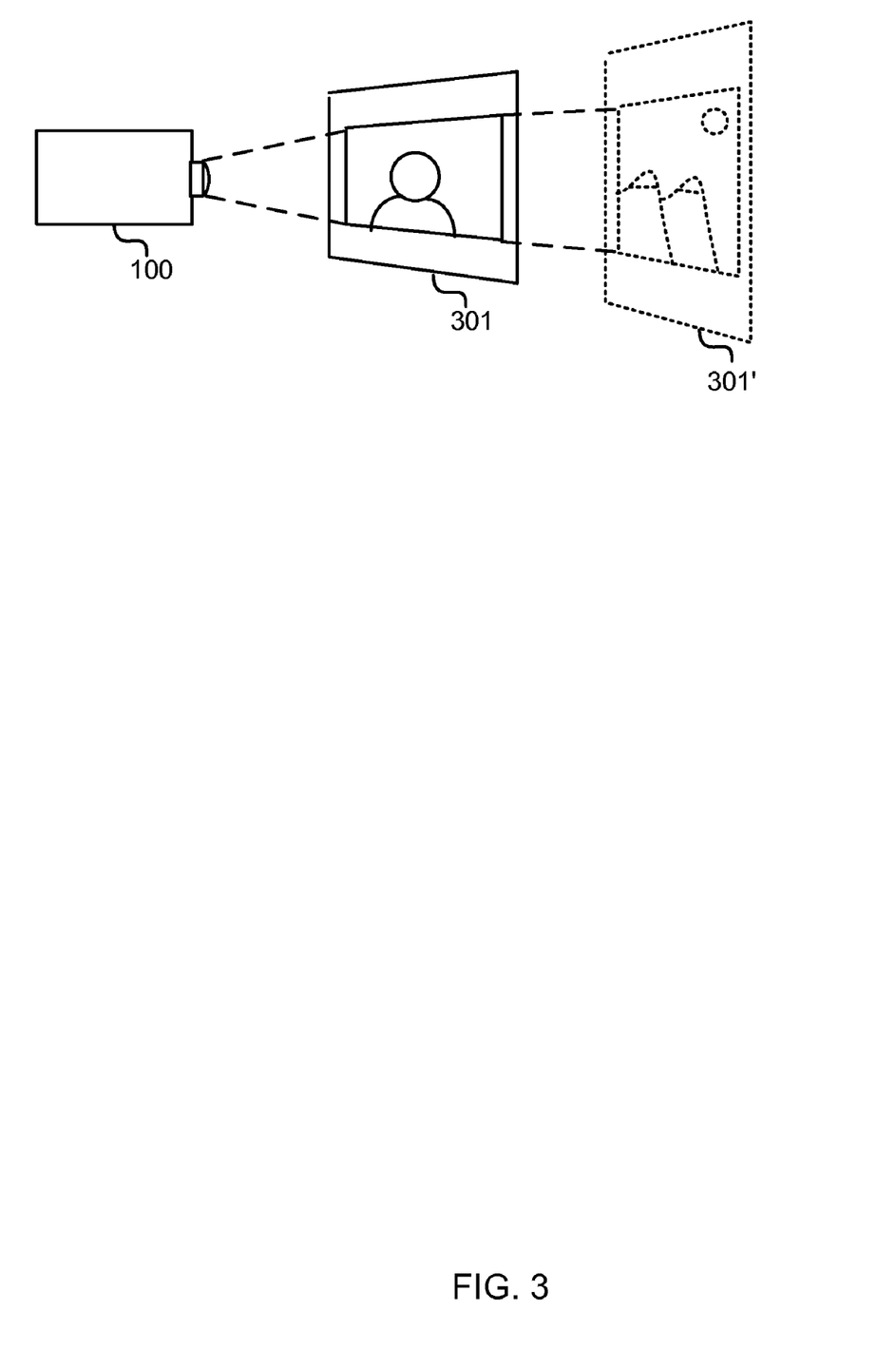
FIG. 3 shows a schematic diagram of the operation of the apparatus of FIG. 1.

FIG. 2 shows an example flow diagram of a method of operation of the apparatus 100 and this can be described with reference to the schematic diagram of FIG. 3. Although the examples below refer to the display and navigation of an archive of images, this is by way of example only and any media may be displayed and navigated using the apparatus and methods described. The apparatus 100 determines the distance between the projector and a projection surface 301 (block 201) and projects digital media (or a part thereof) selected (in block 202) based on that distance (block 203). Therefore as the distance between the projector and the projection surface is changed (e.g. the surface is moved to the position 301' shown by the dotted lines in FIG. 3), the image which is being projected changes. The sequence in which the images are displayed with changing distance may be according to the time that the image was taken or saved, according to file name (e.g. alphabetically) or according to any other criteria. As described below, images may be displayed directly one after the other or in other examples, a blank screen may be displayed between images. An audible alert (e.g. a bleep or click) may be provided in some examples as the image (or media file) displayed changes.

The projection surface 301 may be any suitable surface, including, but not limited to, a piece of paper or cardboard, a Perspex block (or block made of any other suitable material), a user's hand and a display screen. The surface need not be flat, but may be a shaped object such as the user's hand, a glass globe etc. In one example, the projection surface may be attached to the apparatus 100 and mounted on a slider, whilst in many examples, the projection surface is not attached to the apparatus and may be selected by the user.

The apparatus described above enables an archive of digital images (such as photographs) to be navigated through, by moving the projection surface closer to or further away from the projector. As the distance changes, so the images displayed change without requiring a high level of user engagement.

The apparatus provides a quick and easy means of navigation through an archive and further provides a seamless transition between navigation and display of an image. When a user has identified an image that they wish to display by changing the distance between the projection surface and the projector, in order to display the image for a longer period of time, the projection surface is left in the same position. Where the projection surface has a stable base (e.g. a Perspex block) no fixing or support means may be required, however if the projection surface cannot stand on its own, such as a piece of paper or card, some fixing/support means or holder (e.g. a card holder) may be used.

The apparatus may also be arranged to adjust the focus of the projector and/or the size of the projected image based on the distance determined (in block 201) and/or analysis of the projected image (e.g. where the sensor is a computer vision system). It will be appreciated that other aspects of the display may also be adjusted based on the determined distance (e.g. illumination levels) and/or any other detected parameters (e.g. the projection parameters may be varied according to the particular type of projection surface used).

Figure 4:
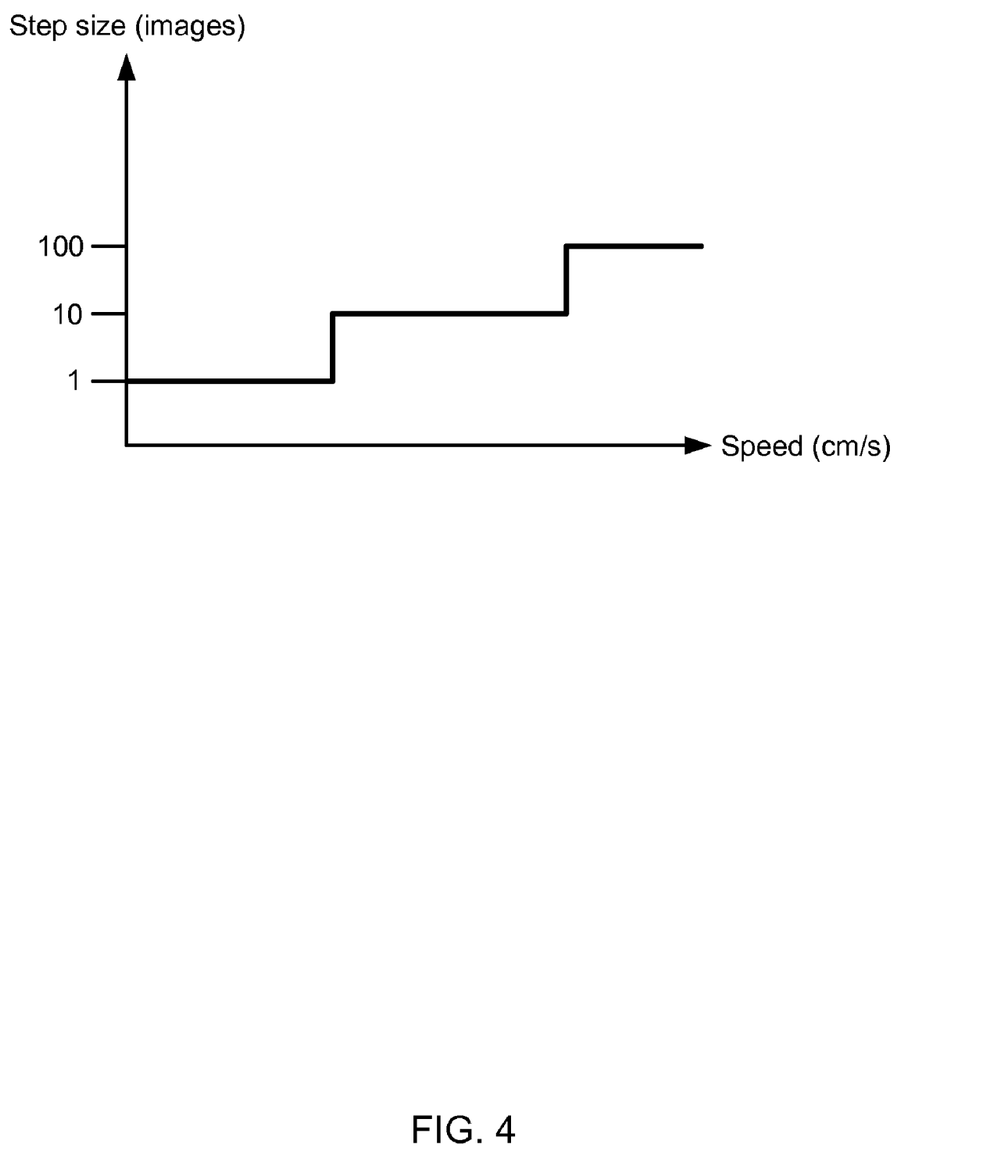
FIG. 4 shows an example graph of the relationship between the speed of the projection surface and the step size with which media is displayed.

In an example, there may be a linear relationship between the images displayed and the distance between the apparatus and the projection surface (e.g. one image every 5 millimeters). The relationship may, in some examples, be quantized, such that an image is displayed over a short distance region before the next image is displayed. In other examples, however, the relationship may be non-linear and in some examples, the speed of the relative movement of the apparatus and the projection surface (i.e. the rate of change of the distance measured by the sensor) may affect the navigation properties. In one such example, moving the projection surface fast (either towards or away from the apparatus) results in the apparatus stepping through the images in large increments (e.g. every $10^{th}$ image shown, every $50^{th}$ image shown), whilst moving the projection surface slowly results in the apparatus stepping through the images individually, as shown in the example graph of FIG. 4. This enables a user to navigate through a large archive of images without requiring a very large variation in the distance between the projection surface and the apparatus.

Figure 5:
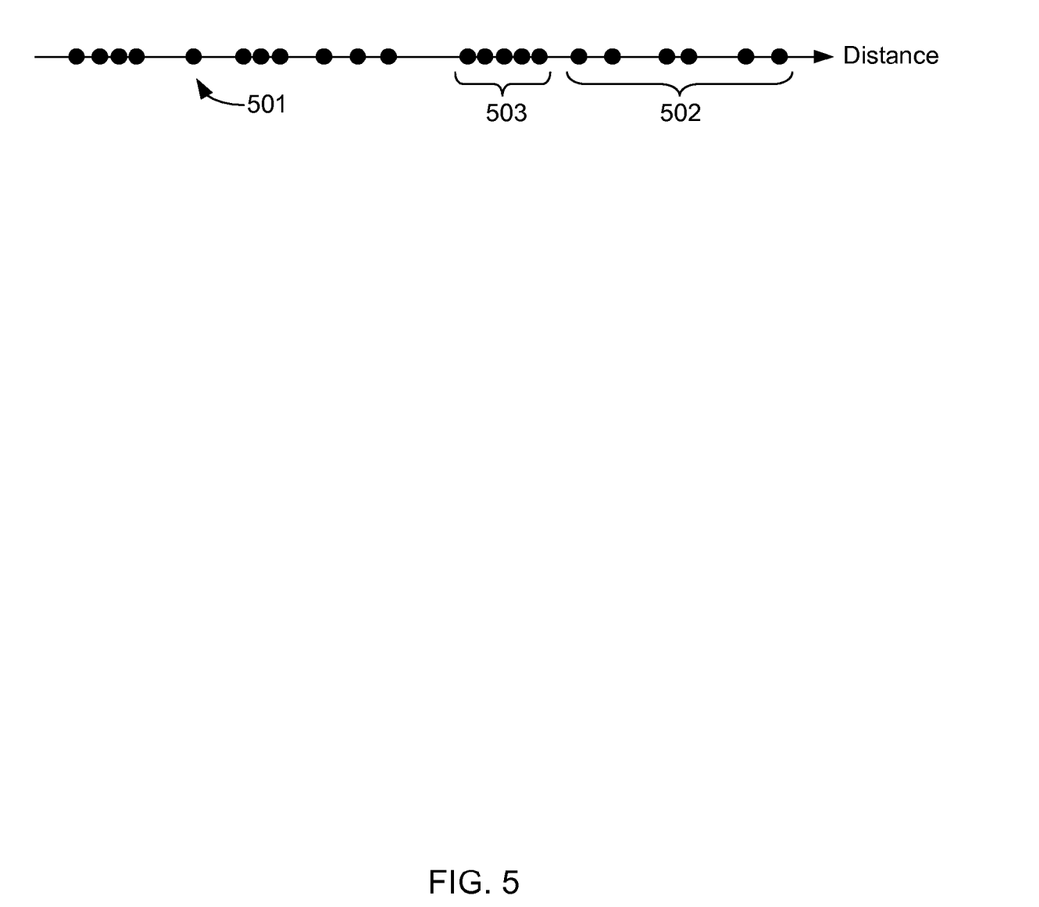
FIG. 5 shows an example timeline for digital photographs.

In another example, the images may be displayed sequentially according to the date and time when the images were captured. In this example, the distance between the apparatus and the projection surface may represent a time line, as shown in FIG. 5 with each circle 501 representing a different image, and the speed of navigation may be a property of both the change in separation of the apparatus and projection surface and the interval between image capture. For example, a movement of 10 cm may represent a week and if very few images were captured in a particular week, the apparatus may sequence through the images slowly as the distance detected changes (e.g. in region 502). However, if a large number of images were captured in a short time period (e.g. in region 503), these may be sequenced through much more rapidly as the distance detected changes.

It will be appreciated that aspects of these navigation schemes may be combined in any manner to create additional navigational schemes without losing the effect sought.

Figure 6:
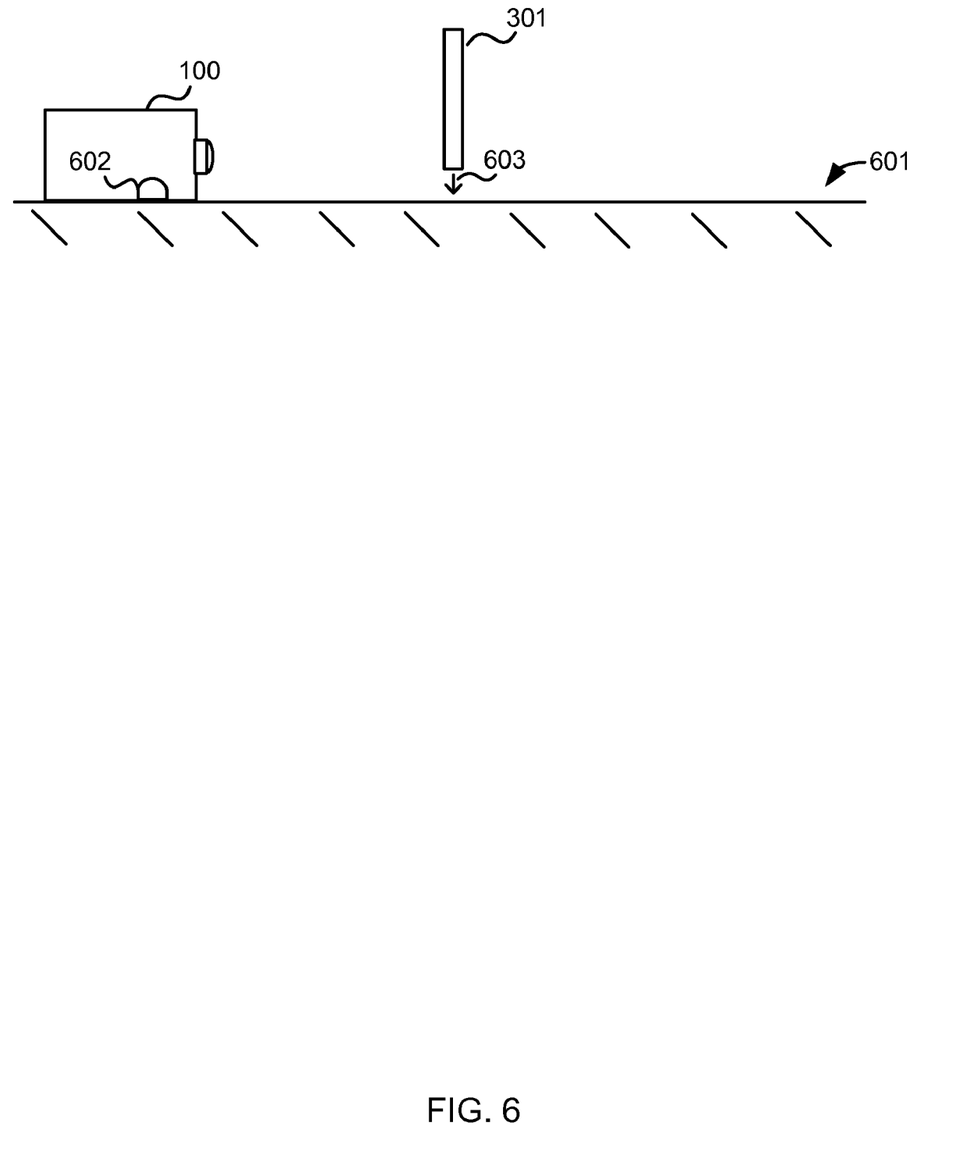
FIGS. 6 and 7 show two further examples of an apparatus for viewing, displaying and navigating digital media.
Figure 7:
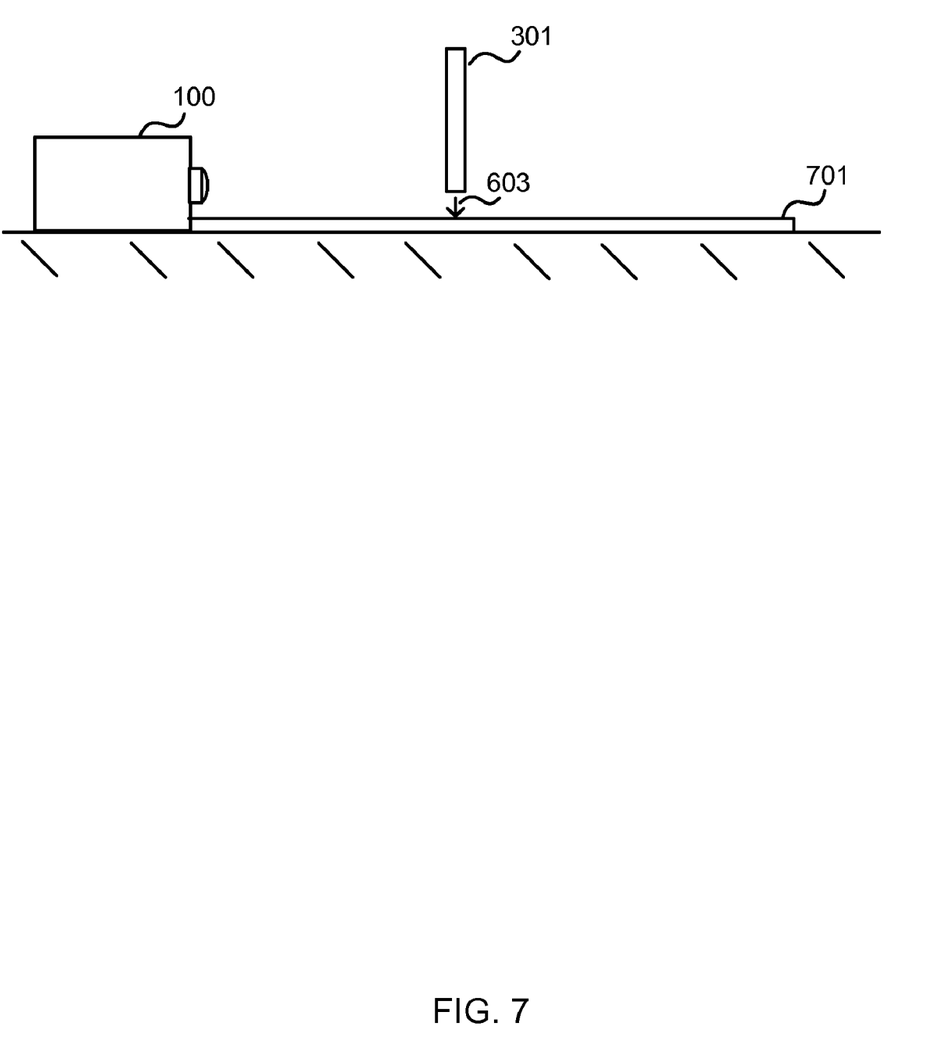

The apparatus may further be arranged to detect simple gestures and these may affect the navigation and display properties of the apparatus. Such gestures may include tapping of the projection surface against a surface, tilting the projection surface, moving the projection surface in a defined motion (e.g. side to side, up and down or a circular motion) in a plane perpendicular to the projected beam etc. In a first example, the apparatus may be arranged to detect a tap caused by the projection surface being brought into contact with another surface. In such an example, the sensing system 102 may further comprise a vibration sensor, a microphone, a pressure sensor or other sensing means for tap detection. Two examples are shown in the schematic diagrams of FIGS. 6 and 7. In FIG. 6, the apparatus 100 is placed on a surface 601 and a vibration sensor (or microphone) 602 can detect vibrations caused by the projection surface 301 being tapped against the surface (as indicated by arrow 603). In FIG. 7, the apparatus 100 includes (or is connected to) a pressure sensitive mat 701 which detects when the projection surface 301 is tapped against it. Alternatively, the detection may be achieved through image analysis where the sensing system comprises a computer vision system, as described below.

The tap, or other detected simple gesture, may cause the particular image to be "bookmarked" (or flagged in some way) such that when navigating through the archive, the image is displayed for a longer period of time (or a longer change in distance) than other non-bookmarked images. In another example, the bookmarking may result in the image being selected for display when navigating in increments larger than one image (e.g. where every $10^{th}$ image is displayed, plus those bookmarked images).

In another example, the detected gesture (such as the tap described above) may cause the particular image (or other media file) to be deleted.

Figure 9:
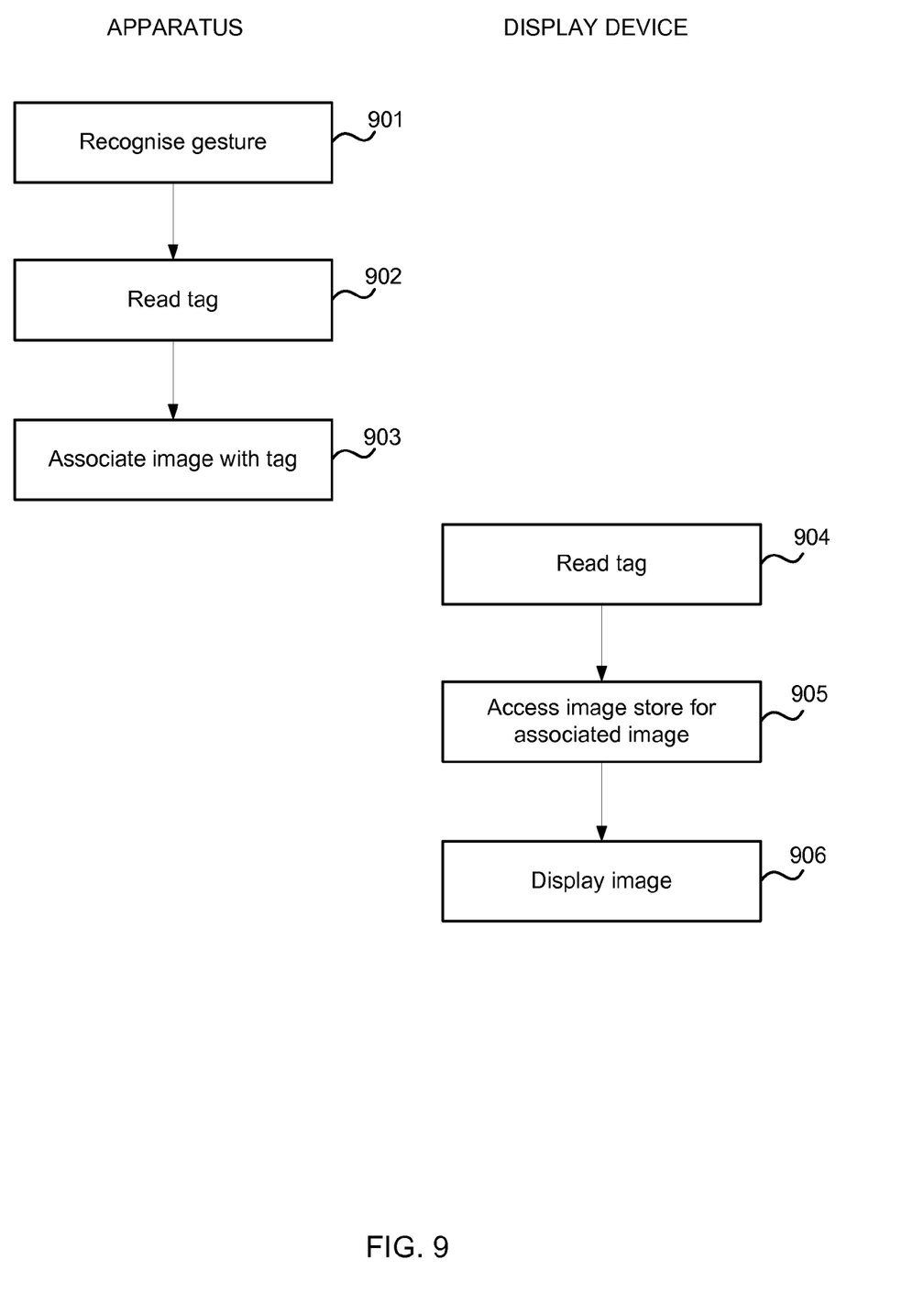
FIG. 9 is an example flow diagram of a method of operating the system of FIG. 8.

A simple gesture may also be arranged to enable the image to be moved to another device, such as another display device, as can be described with reference to the schematic diagram shown in FIG. 8 and the example flow diagram of FIG. 9. An image can be selected by moving the projection surface 301 with respect to the apparatus 100 (to change the separation, as described above). The projection surface 301 includes an RFID tag 801 and the apparatus 100 includes an RFID reader 802. In order to select the image to move it, a simple gesture is used. For example, the apparatus may be arranged to detect (block 901) a vertical shaking of the projection surface, as indicated by arrow 803. On recognition of the gesture the apparatus reads the RFID tag 801 in the projection surface using the RFID reader 802 (block 902) and associates the image currently being projected with the particular tag (block 903). This linking of the image and the tag may be stored in the apparatus, in the data store 804 (which in this example is external to the apparatus and accessible via a network 805), or elsewhere. Subsequently, if the projection surface is moved away from the apparatus to another display device 806 which includes an RFID reader 807 (as shown by the dotted outline 301"), the display device can read the RFID tag 801 in the projection surface (block 904) and access the image store 804 for the associated image (block 905). The image can then be displayed on the display device 806 (block 906).

It will be appreciated that the reading of the RFID tag 801 in the projection surface by the apparatus (block 902) may alternatively be performed prior to the detection of the gesture (e.g. prior to block 901).

The use of an RFID tag and reader is just one example of a suitable tagging (or identification) technology which may be used. In other examples, other technology may be used, such as barcodes (which may be read using visible or infra-red radiation) or any object recognition technology.

Whilst in FIG. 8, the image store is shown separate from the apparatus, the image store may alternatively be part of the apparatus. In this case, the second display device 806 may access the apparatus (in block 905) in order to obtain the image for display (in block 906). Additionally, whilst a network is shown connecting the apparatus and the other display device 806, in other examples, the devices may be connected by a point to point link. In the situation where a point to point link is used (e.g. a wireless connection such as Bluetooth) it may not be necessary to have a tag (or other identification means) within (or on) the projection surface. In this example, on recognition of the defined gesture (as in block 901), the apparatus may send the image currently being projected to the other display device over the point to point link such that it can be displayed. For example, the apparatus may have a Bluetooth pairing with an electronic picture frame device (e.g. an LCD screen with associated processing and display capabilities) and a user may use the apparatus 100 to browse through the archive of digital images to select one for display in the electronic picture frame device.

The device to which the image is transferred may be a device other than another display device (as shown in FIG. 8). For example, the image (or other media) may be transferred, using the methods described above, to a mobile telephone, a music/media player, a portable memory device (e.g. a USB memory key), a PDA, laptop or tablet computer.

It will be appreciated that instead of using gesture recognition, the apparatus may be provided with one or more buttons (not shown in FIGS.) to enable a user to bookmark an item, delete an item, transfer an item to another device or initiate playback (as described below).

As described above, the detection of the separation between the apparatus and the projection surface may be achieved by any suitable sensor or sensing system. In one example the sensing system may comprise a computer vision system which includes a camera. The computer vision system may determine the separation by capturing the projected image and analyzing the size of the projected image and/or the size of the projection surface. The computer vision system may also be arranged to detect movement of the projection surface and thereby detect gestures. In some examples, the projection surface may include a graticule or other mark which the computer vision may track and analyze in order to determine the movement of the projection surface in the image plane and/or in a direction perpendicular to the image plane.

In addition to, or instead of, navigating through archives of images as described above, the apparatus may be used to navigate through large documents or files (e.g. PowerPoint (trade mark) files), referred to herein collectively as 'data files'. In this case, the navigation through a single document or file may be achieved by changing the separation between the apparatus and the projection surface. This change is detected by the apparatus and the portion (e.g. page) of the document/file being projected is changed according to the separation detected.

The apparatus described above may be used to display videos (in addition to or instead of other media types), such as short video clips captured on a mobile phone or digital camera or longer video clips captured using a video camera. The apparatus may be used to navigate both through an archive of different videos and through individual clips, as described in the examples below.

In a first example, detection of a change in the separation of the apparatus and the projection surface may result in navigation through an archive of video clips, and as each video clip is projected it may start to play automatically. Alternatively, the playback may not start until the apparatus recognizes a gesture (e.g. a tap or shake as described above). As the detected separation changes, a blank screen (e.g. a white or black screen, or nothing) may be projected between each video so that it is clear when the apparatus changes between video clips. In other examples, a sound may be made by the apparatus (e.g. a click or bleep) on the change between video clips.

In a second example, a change in the separation of the apparatus and the projection surface may result in navigation through a particular video clip. In this example, the apparatus determines the separation between it and the projection surface (as in block 201) and determines which part of the video clip should be played according to the determined separation distance. This enables a user to easily scan through a video clip to find portions of interest.

In a third example, the first and second examples may be combined such that small changes in detected separation (e.g. of the order of a few millimeters) or slow changes in detected separation may result in the apparatus navigating within a particular video clip whilst larger changes in detected separation or faster changes in detected separation may result in the apparatus navigating between video clips in the archive.

The apparatus described above may also be used for navigating archives of non-visual media, such as audio clips or music. In this situation, the apparatus may project album art or other visual representations of the clips (e.g. titles, date/time of recording etc) and these may be navigated through by changing the separation between the apparatus and projection surface as described above. When a new audio clip/song is selected (by displaying the appropriate album art or other visual representation), the audio clip/song may automatically begin to play. Alternatively, the playback may not start until the apparatus recognizes a gesture (e.g. a tap or shake as described above). In some examples, navigation within an audio clip/song may be possible, using the techniques described above with respect to video.

It will be appreciated that the apparatus described herein may be suitable for displaying and navigating through other types of media not described above. The device is particularly suited to archived media that a user might want to see at a glance and/or navigate in sequence, such as address book entries, reference materials, catalogues, etc. It will be appreciated that the media may be user generated (e.g. the user's own digital photographs) or the media may be purchased or obtained from a third party (e.g. a user may purchase an archive of pictures/text about plant specimens or an encyclopedia).

Whilst the above examples refer to moving the projection surface in order to change the separation between the apparatus and the projection surface, in some examples, where the apparatus is portable, the apparatus may alternatively be moved (or both may be moved). The apparatus may be incorporated within a mobile device such as a mobile telephone, a PDA, laptop or tablet computer. Additionally, whilst the movement is shown in FIGS. 3, 6 and 7 in the horizontal plane, this is by way of example only. In other examples, the apparatus may be arranged to project vertically (up or down) or at any other angle. The projection surface used may be selected according to whether the projection is arranged as rear projection (e.g. from behind the viewing surface of the projection surface) or front projection (e.g. from in front of the viewing surface of the projection surface, as shown in FIG. 3).

The apparatus described above enables a user to easily navigate through an archive of media, which may comprise images, audio, video, documents or any other media type. The navigation may be enhanced by gesture recognition to control playback, delete media items and/or enable the media to be transferred between devices. The apparatus can be arranged to display the media in a predictable linear sequence (e.g. based on a time line, alphabetical order etc) such that a user can return to a previously viewed item easily and intuitively. By leaving the projection surface in a static position or by moving the item to another display using a gesture, a seamless transition is provided between navigation and display.

Figure 10:
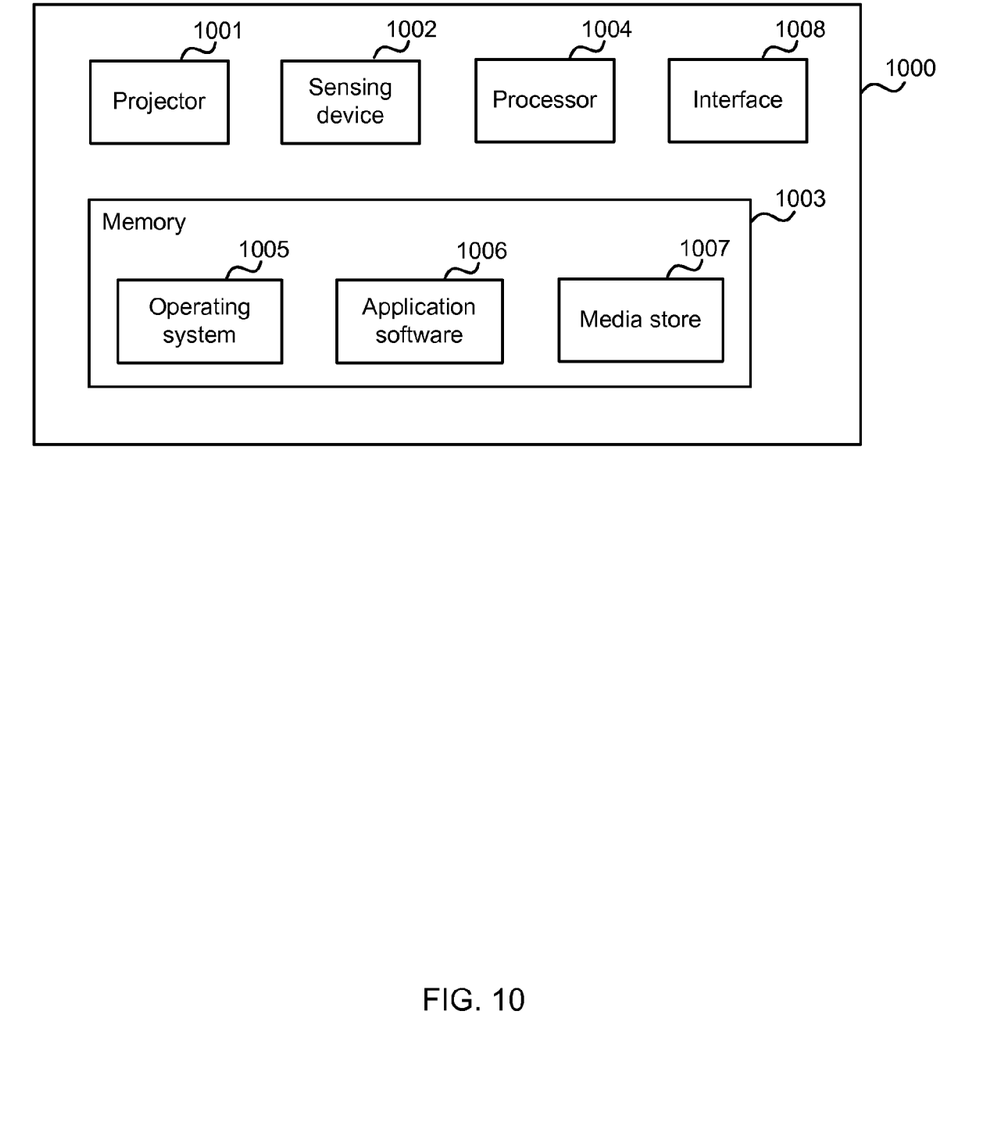
FIG. 10 is a schematic diagram of another apparatus for viewing, displaying and navigating digital media.

FIG. 10 illustrates an alternative embodiment of the apparatus described above which may be implemented as any form of a computing and/or electronic device. Computing-based device 1000 comprises a projector 1001 and a sensing device 1002, which may be a sensor, camera, computer vision system or any other device. The sensing device 1002 may be a self-contained device capable of determining the separation between the apparatus and a projection surface, or this determination may be made in conjunction with a processor 1004. The processor may be a microprocessor, controller or any other suitable type of processor for processing computing executable instructions to control the operation of the device in order to perform the methods described above.

The device 1000 also comprises memory 1003, which may be of any suitable type such as random access memory (RAM), a disk storage device of any type such as a magnetic or optical storage device, a hard disk drive, a removable storage device such as a CD, DVD, memory stick, flash card, smart media or thumb drive or other disc drive. Flash memory, EPROM or EEPROM may also be used. The memory may be arranged to store platform software comprising an operating system 1005 or any other suitable platform software may be provided at the computing-based device to enable application software 1006 to be executed on the device. The application software 1006 may comprise the computer executable instructions to cause the apparatus to perform the methods described above. The memory may also be arranged to store the media being displayed (e.g. in media store 1007) or alternatively this may be stored externally to the device.

The computing-based device 1000 may also comprise an interface 1008 to enable the device to communicate with other devices across a network or over point to point links (as described above).

The device may also comprise additional elements, not shown in FIG. 10, such as an audio output or speaker (for playing media which includes audio or for providing audible alerts as described above), user input means (e.g. buttons) or an interface to a user input means (e.g. an interface for connection to a mouse) etc. The device may also comprise a display (e.g. a small LCD screen) in order to be able to display status or other information. However, in some examples, status information may be provided using the projector 1001.

Although the present examples are described and illustrated herein as being implemented in a computing-based system, the system described is provided as an example and not a limitation. As those skilled in the art will appreciate, the present examples are suitable for application in a variety of different types of projection systems.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person. Elements of any of the examples or methods described herein may be combined with elements of other examples or methods to provide further examples without losing the effect sought.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate. Additionally, individual blocks may be deleted from any of the methods without departing from the spirit and scope of the subject matter described herein.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. An apparatus for displaying and navigating media comprising:
   a projector arranged to display image files stored in a media store; and
   a sensing system arranged to determine a distance between said apparatus and a projection surface,
   wherein an image file is selected from the media store dependent upon said determined distance between said apparatus and said projection surface.

2. An apparatus according to claim 1, further comprising:
a processor; and
a memory arranged to store executable instructions to cause the processor to select media from a media store dependent upon said determined distance and to display said selected media using said projector.

3. An apparatus according to claim 1, wherein said sensing system comprises a distance sensor.

4. An apparatus according to claim 1, wherein said sensing system comprises a computer vision system.

5. An apparatus according to claim 1, wherein said media comprises at least one of: an image, a video clip, an audio clip and a data file.

6. An apparatus according to claim 1, wherein media is selected from a media store dependent upon said determined distance between said apparatus and said projection surface and a rate of change of said distance.

7. An apparatus according to claim 1, further comprising means for detecting an additional movement of said projection surface.

8. An apparatus according to claim 7, wherein said means comprises a computer vision system.

9. A method of displaying and navigating media comprising:
storing a plurality of images to a media store for a projector;
determining a distance between a projector and a projection surface; and
selecting at least one image for display from a plurality of images stored in a media store for display based on said distance; and
displaying said selected image using said projector.

10. A method according to claim 9, wherein selecting media for display based on said distance comprises:
selecting the media item for display based on said distance and a rate of change of said distance.

11. A method according to claim 9, wherein said media item is selected sequentially from said plurality of media items based on said distance.

12. A method according to claim 9, further comprising:
detecting a predefined movement of said projection surface, said predefined movement being the result of at least one of the following:
tapping the projection surface against another surface;
tilting the projection surface;
moving the projection surface in a side to side motion;
moving the projection surface in an up and down motion; or
moving the projection surface in a circular motion; and
wherein selecting media for display based on said distance comprises:
selecting media for display based on said distance and said detected predefined movement.

13. A method according to claim 9, further comprising:
detecting a predefined movement of said projection surface; and
wherein displaying said selected media using said projector comprises:
upon detection of said predefined movement, playing said selected media.

14. A method according to claim 9, further comprising:
detecting a predefined movement of said projection surface;
reading identification information from said projection surface; and
associating said identification information with media currently being displayed.

15. A method according to claim 14, wherein said identification information comprises one of a barcode and an RFID tag.

16. A method according to claim 9, wherein said media item comprises at least one of: an image, a video clip, an audio clip or a data file.

17. A method of displaying and navigating media comprising:
determining a first distance between a projector and a projection surface; and
selecting a first image file for display from a plurality of image files stored in a media store for display based in part on the first distance; and
displaying the selected first image file using the projector;
moving the projector or the projection surface to a new position;
determining a second distance between the projector and the projection surface; and
selecting a second image file for display from the plurality of image files stored in the media store for display based on the second distance; and
displaying the selected second image file using the projector.

* * * * *